Patented July 4, 1944

2,352,604

UNITED STATES PATENT OFFICE 2,352,604

METHOD OF PREPARING ZEIN SOLUTIONS DIRECTLY FROM GLUTEN

Roy E. Coleman, Chicago, Ill., assignor to Time Incorporated, a corporation of New York No Drawing. Application November 30, 1942, Serial No. 467,402

15 Claims. (Cl. 106—153)

This invention relates to methods of preparing commercially usable solutions and coating composition of prolamines or prolamine-containing proteins directly from glutens, either corn, wheat, barley, etc. It is particularly directed to such methods which will produce solutions and coating compositions of the alcohol-soluble portion of corn gluten, of controlled solution and gelling characteristics.

Heretofore, in the preparation of zein solutions and coating compositions, including the substantially non-aqueous zein solutions and coating compositions of controlled solution and gelling characteristics as described in my prior Patent No. 2,185,110, granted December 26, 1939, for example, the zein is initially isolated from corn gluten and then dissolved in suitable solvents to form the desired solutions. To isolate zein from corn gluten as a commercially usable powder is a laborious and expensive process, involving steps of precipitation, settling, filtering, washing and drying. The solubility of the zein in zein solvents and the solution characteristics such as stability and gelling tendencies are largely dependent upon the care exercised in carrying out the steps of the process.

In accordance with the present invention I prepare solutions of zein or zein-containing proteins directly from corn gluten under conditions that will readily produce a wide variety of zein products in so far as properties and solubility characteristics are concerned, and thereby avoid the expense and objections incident to the preliminary isolation of zein in powder form. In carrying out the present invention, corn gluten, for example, in granular or powdered form, is treated with a suitable solvent mixture, without the establishment of special conditions of hydrogen ion concentration either in the solvent or in the gluten, to extract the zein from the gluten. The solvent mixture comprises a base solvent having a boiling point above about 125° C., preferably above about 150° C. and a diluent or extender having a boiling point below about 125° C. and, preferably, of about 100° C. and below. The base solvent is itself a solvent for zein and the diluent may be, and preferably is, also a solvent for zein. The base solvents and diluents in accordance with the present invention will be defined fully hereafter.

The extraction is carried out at elevated temperatures, say from about 120° to about 170° F., preferably between about 140° to about 150° F., for a short period of time generally not exceeding about three hours. It is preferred that the extraction time be not longer than about one-half to about one hour since within this time and at the temperatures stated, the zein in the gluten is extracted and is not deleteriously affected.

The extract solution obtained as above described is now separated from the residual gluten by filtration, pressing, centrifugal separation or in any other desirable manner and is distilled or otherwise treated to remove all or some of the diluent, as desired. It may be filtered preliminarily to the step of removing the diluent, if necessary. The resulting residue is a solution of zein or zein-containing protein in the base solvent alone with all of the diluent from the extract solution removed, or in the base solvent and that portion of the diluent which has not been removed. The residual gluten, which still contains some protein, may be freed from retained solvent by washing and recovered for further use as a cattle food or for other purposes.

The resulting zein or zein-containing solutions in accordance with the present invention, over a wide range of concentrations, are stable on standing at temperatures of 80° F. and below and do not separate even when cooled to temperatures of 50 to 70° F. and somewhat below. When cooled even to temperatures as low as 10° above zero or to zero, solutions prepared in accordance with the present invention may separate and become solid; however, on heating again to temperatures of from about 45° to 70° F., a resolution is effected, either without stirring or with slight stirring, and the solutions return to their normal form at the re-heating temperatures. In general, these solutions are substantially non-gelling and have but a slight tendency to increase in viscosity; that is, to thicken or become heavier in body. In many instances they exhibit practically no tendency to thicken or to gel over practical periods of time in the order of about 3 to 6 months and even up to one year and longer. These solutions remain stable and reasonably constant in their characteristics during the periods necessary for transportation and distribution, either in bulk or in packages, or for storage for reasonable periods of time, and hence their field of applicability is greatly increased.

An alternative method of obtaining the stable, substantially non-gelling solutions is as follows. The gluten is extracted with a diluent in accordance with the present invention, which diluent is a solvent for zein, the conditions of extraction being as set forth above, and the extract is then mixed with the base solvent and treated to remove the diluent solvent as already described.

It would appear that the base solvent could be used alone to extract prolamine from gluten and thus obtain the desired solutions. Practical considerations, however, preclude their use in this manner. When the base solvents are used alone as the extracting media they should be used in proportions to provide at least about 3 to 3½ parts by weight of solvent to 1 part by weight of gluten. Because the base solvents alone are not particularly effective in extracting prolamine from gluten, the resulting solutions have a low prolamine content, generally not in excess of 10% by weight and usually considerably less. Due to the high boiling points of these solvents, concentration of the solutions to a higher prolamine content is difficult and impractical.

In general, in the concentration of zein or other prolamine in commercially usable solutions containing about 12 to 30% of protein, the amount of base solvent necessary to obtain these concentrations in the final solutions is in and of itself insufficient to give the proper relation between solvent and gluten for effective extraction results. If large amounts of the relatively high boiling point base solvents are used, sufficient to give the proper relation between solvent and gluten, the extraction results are not sufficiently effective and, moreover, the cost of treating the extracts to obtain the desired solids concentration is so prohibitive as to make this procedure commercially unfeasible as pointed out above.

The desired solvent to gluten ratio in accordance with the present invention is secured by adding to the desired amount of relatively high boiling point base solvent or mixture of base solvents one or more of the so-called relatively low boiling point diluent solvents. To obtain effective extraction results, the solvent to gluten ratio should be in the order of about 2½ to 10 parts by weight of the former to about 1 part by weight of the latter. Due to the presence of a diluent or extender in the extracting solvent, the solvent to gluten ratio may be less than that which would be required with a base solvent alone and, notwithstanding the lower solvent to gluten ratio, the extraction results are generally more effective. The diluent solvent or extender must have a lower boiling point distillation range than the base solvent. It is preferred that these diluent solvents or extenders be of substantially lower boiling point and distillation range than the base solvent, as pointed out above.

The protein content of gluten varies widely, depending largely upon the source of the gluten and the method of making it or obtaining it as a by-product. In the case of corn gluten now on the market, the protein content varies from about 40% to 70%. Of this protein content, about 50% to 70% is aqueous-alcohol soluble and is extractable as zein or zein-containing proteins. The amount of zein or zein-containing proteins extracted in accordance with the methods of the present invention is largely influenced by the particular solvent or solvent mixture used to effect extraction. In accordance with the present invention the amount of base solvent used, in either of the methods described above, should be in a proportion to the amount of zein or other prolamine extracted corresponding to the desired concentration of the prolamine in the resulting stable solution. For example, using a corn gluten containing 60% of protein with an estimated extraction of 65%, 39 lbs. of zein are available in 100 lbs. of the gluten. On the basis of producing a final solution in a base solvent of a solids content of 20%, then 156 lbs. of base solvent will be required for each 100 lbs. of gluten, providing the estimated amount of soluble protein is extracted.

In the first extraction method described above the amount of base solvent used in the solvent mixture is based upon the estimated amount of prolamine which can be extracted from the gluten with the specific solvent mixture used. While this procedure is somewhat empirical, the results obtained are satisfactory for most purposes because rarely is it necessary to obtain solutions with absolutely precise amounts of prolamine and solvent therein. The alternative extraction method lends itself to more precise solution formation because the protein content of the extract solution can be determined prior to the admixture of base solvent with the extract solution.

Base solvents

The base solvents are relatively high boiling compounds or mixtures of compounds as pointed out above and have a suitable balance between the hydrocarbon constituents or radicals present in the solvent or solvent mixtures and the polar constituents or radicals present therein. A certain proportion of hydroxyl radicals in the base solvents is required to secure solvent action. Other polar radicals such as —O— (either oxygen), —Cl, —NH$_2$ and COOH appear to aid or cooperate with the —OH in securing the necessary conditions of polarity in the base solvents (in which term I include mixtures of base solvents), for solvent action.

The proportion of polar radicals to hydrocarbon or non-polar radicals which I have found to be desirable lies within a range which extends between the limits of absolute methanol on the one hand, having 53% hydroxyl and 47% hydrocarbon radicals, and absolute ethanol on the other hand having 37% hydroxyl and 63% hydrocarbon radicals. The benzyl radical acts as if it were intermediate the methyl and ethyl radicals. This range is approximate and may vary somewhat depending on the solvent or solvent mixture used. The limits of this range are indicative of solvent properties and provide a close and adequate guide to enable the operator, by simple experimentation, to determine the required balance of polar and hydrocarbon radicals in the base solvent or mixture of base solvents in accordance with the present invention.

It may be stated that the base solvents in accordance with the present invention may be any one of the solvents or mixture of solvents described in my prior Patent No. 2,185,110 which has the required balance of polar and non-polar radicals, and a boiling point above about 125° C., preferably, above about 150° C. as pointed out above. For a more complete description of the kinds of solvents which may be used as base solvents in accordance with the present invention than is disclosed herein, reference is made to the description of these solvents in my prior Patent No. 2,185,110.

Examples of base solvents in accordance with the present invention are the glycols such as diethylene glycol, propylene glycol, triethylene glycol and mixtures thereof, including mixtures which contain ethylene glycol; diacetone alcohol; closed chain cyclic alcohols such as benzyl alcohol, cyclohexanol, furfuryl alcohol, tetrahydrofurfuryl alcohol and mixtures of closed chain alcohols; glycol ethers such as ethylene glycol mono-methyl ether, diethylene glycol monomethyl ether, ethylene glycol mono-ethyl ether, diethylene glycol monoethyl and mixtures of glycol ethers; mixtures of two or more of the foregoing enumerated base solvents; mixtures of one or more of the foregoing base solvents with glycerine, or other solvents or mixtures of solvents, providing the mixture has the required polar to non-polar radical balance and the required relatively high boiling point. It is to be understood that the foregoing specifically mentioned solvents or mixtures of solvents is not intended to be inclusive of all the base solvents which may be used in accordance with the present invention since they are merely set forth for illustrative purposes.

Diluent solvents

The diluent solvents or extenders in accordance with the present invention may be, suitably, a single solvent or a solvent mixture which may or may not be a solvent for zein or other prolamine, as desired. It is preferred, however, that the diluent or extender be a solvent for zein. Thus, the extending solvent may be one or more of the well-known alcoholic zein solvents such as anhydrous methanol, or constant boiling point mixtures (azeotropes) of aliphatic alcohols such as 95% ethyl alcohol and 91% isopropyl alcohol. For convenience herein I term these alcoholic solvents "concentrated alcohol solvents." The diluent solvents may also be one or more of the concentrated alcohol solvents containing additional amounts of water, say from 40% to 50% in anhydrous methanol or in excess of that present in the azeotropes 95% alcohol and 91% isopropyl alcohol. Greater or lesser amounts of water than as stated may be used; however, best results are obtained with the use of added amounts of water within the percentage range stated. For convenience herein I term these alcoholic solvents "aqueous alcohol mixtures."

Another class of diluent solvents in accordance with the present invention comprises mixtures of an azeotropic concentrated alcohol solvent with a non-solvent and water. Examples of such diluents are mixtures of 95% ethyl alcohol or 91% isopropyl alcohol with dichlorethylene, trichlorethylene, ethyl acetate, benzene, cyclohexane, etc., and water. In this class of diluent solvents I also include non-aqueous azeotropic mixtures of anhydrous methyl alcohol with hexane, cyclohexane, benzene, carbon tetrachloride, dichlorethylene, trichlorethylene, acetone, methyl acetate, ethylacetate, methyl ethyl ketone, etc., because one constituent of the mixture, methyl alcohol, is a zein solvent.

In addition to the foregoing, wherein at least one constituent of a diluent solvent mixture is a zein solvent, the diluent solvents may be suitable azeotropic mixtures which are zein protein solvents wherein the individual constituents of the mixture are non-solvents for zein proteins. Thus, they may be azeotropic mixtures of water on the one hand and dioxan or butyl alcohol on the other. Dioxan forms with water a constant boiling point mixture containing 80% dioxan boiling at 86.9° C.; and butyl alcohol forms with water a constant boiling point mixture containing 63% butyl alcohol boiling at 92° C. They may also be suitable aqueous azeotropic mixtures which are non-solvents for zein proteins such as ethyl methyl ketone and water. And they may also be non-aqueous azeotropic mixtures of anhydrous ethyl alcohol or anhydrous isopropyl alcohol with hexane, cyclohexane, benzene, carbon tetrachloride, dichlorethylene, trichlorethylene, acetone, methyl acetate, ethyl acetate, methyl ethyl ketone, etc.

The diluents may also be suitable non-solvents of low polarity characterized by the presence of —O—, —Cl, —NH₂, —COOH groups, etc. Examples of such diluents are dioxan, dichlorpentane, ethylene dichloride, dichlorethyl ether, etc. They may also be miscible hydrocarbons such as benzene, hydrogenated naphtha, etc. Or they may be suitable non-solvents of high polarity such as anhydrous ethanol, anhydrous isopropanol or water.

In general, extracting solvents consisting of or including the aqueous alcohol mixtures are capable of extracting larger amounts of zein protein from gluten than are the extracting solvents consisting of or including a concentrated alcohol solvent. It has been noted that for practical extraction procedures, using either a concentrated alcohol solvent alone or an aqueous alcohol mixture alone, approximately 2½ parts by weight of solvent to 1 of gluten may be used. At this concentration, with gluten containing approximately 60% total protein, the extract solutions of the concentrated alcohol solvent contain a maximum zein protein content of approximately 10% whereas the extract solutions of the aqueous alcohol mixture solvents contain a maximum zein protein content of from about 12% to about 15% and even up to 20%. In addition, the aqueous alcohol mixture solvents are capable of extracting a substantially larger proportion of a desirable type of zein present in the protein of the gluten than are the concentrated alcohol solvents.

It is possible, in accordance with prior art teachings, to extract zein or zein-containing proteins from gluten by the use of anhydrous methanol or constant boiling point mixtures of the alcoholic solvents such as 95% ethyl alcohol and 91% isopropyl alcohol to obtain extract solutions which can be concentrated to a desired zein content and still maintain uniform solvent composition. Such solutions, however, have a very limited use, due largely to the character of the zein extracted by the solvents and to the solvents themselves. It is evident that extract solutions of zein or zein-containing proteins in the more aqueous alcoholic solvents cannot be concentrated and still maintain a constant solvent composition. Zein solutions of a desired concentration and of a wide applicability can be obtained directly from gluten by having in the final solution as the only solvent or as the main solvent for zein, a relatively high boiling point solvent having the required balance of polar and non-polar radicals as described herein. It is now well established that the viscosity, gelling tendencies, and practical usability of zein solutions are in no small part dependent upon the character of the solvent in which the zein is dissolved.

Zein or zein-containing extract solutions containing any one or more of the foregoing base solvents, in accordance with the present invention, regardless of the manner of obtaining these extract solutions, may be boiled, distilled or otherwise treated to remove part or all of the diluent. It is evident that practically all of the diluent, including any water carried from the gluten to the extract solution, may be removed, thereby obtaining solutions of zein or zein-containing proteins, in the base solvent which, for all practical purposes, are substantially anhydrous. Such solutions vary widely in character, depending upon the choice of solvents or solvent mixtures used, as is to be expected, and some of them may undergo changes (apparent insolubility, for example), during the diluent and water removal which affect the solvent characteristics of the zein and zein-containing proteins in the base solvent utilized. These changes, where they take place, are not of a permanent character and it is possible to effect a re-solution of the zein or zein-containing proteins in the base solvents by the addition of a small amount of water, say in the order of from about 1 to 3% by weight, or an equivalent amount of other highly hydroxylated compound, such as methyl or ethyl alcohol or a mixture of such compounds.

In the preparation of usable solutions having a wide field of applicability, I prefer that the removal of diluent and water be controlled so as to leave in the final solutions at least about 1 to 3% by weight of water or an equivalent amount of other highly hydroxylated compound, preferably water. Where this is not possible, water may be added to the final solution, in the amounts stated. While water is, in general, not an essential constituent of some of the solutions formed in accordance with the present invention, the solutions are generally of an improved character when they contain small amounts of water. The solutions may contain larger amounts of water, say between 5 to 10%, or even more.

As previously indicated, the amount of zein-containing protein extracted from the gluten is influenced by the character of the extracting solvents. It has also been stated that the aqueous alcohols are more effective than the concentrated alcohols in extracting the zein-containing protein, in so far as the amount of protein extracted is concerned, and that the high boiling base solvents differ widely in their extracting properties.

As already pointed out, the type or character of the zein-containing protein produced by the extraction is in no small part dependent on the character of the extraction solvents used. This condition is particularly pronounced when the highly aqueous alcohols or the high water azeotropes such as dioxan-water or n-butyl alcohol-water mixtures are used as diluents. Not only do these diluents effect the extraction of a larger amount of the zein-containing protein than do the more concentrated alcohols, but they also produce by their extraction a type of zein protein which generally produces solutions having a high viscosity and pronounced colloidal consistency. On the other hand the zein protein produced with the concentrated alcohols and less aqueous diluents tends to produce solutions having a lower viscosity and a lesser colloidal consistency. It is thus evident that various types of zein protein having substantially different properties can be produced by proper selection and composition of the diluents.

From the foregoing it is manifest that the nature and properties of the finished solution will be determined by the nature of the base solvent, the amount of zein protein present in the solution and the type or character of the zein protein extracted by the particular diluent used. It is apparent that with the solvent and diluent combinations possible, a wide variety of solutions for many uses can be produced by the methods of the present invention.

Within the range of the many possible combinations and the methods in accordance with the present invention, solutions may be produced which require further adjustment or modification in order to secure improved solution or desired stability and controlled gelling properties. Such adjustments or modifications can be readily effected by the use of rosin, fatty acids, compatible amines such as monoethanolamine, triethanolamine, etc., amine soaps of rosin or fatty acids, or by the various methods and materials for producing stable, controlled gelling, zein solutions described in my issued Patents Nos. 2,185,122; 2,246,779 and 2,298,548. The addition of suitable materials for effecting desired modification or adjustment may be made to the extract solution before distilling off the diluent or to the final solution. The preferable procedure and materials with particular solutions may be easily determined by experimentation.

In the following examples I disclose illustrative methods for producing zein or zein-containing solutions directly from gluten in accordance with the present invention. In the examples and elsewhere throughout the specification, the term "parts" indicates parts by weight.

*Example 1.*—A solvent mixture containing 32 parts of 91% isopropyl alcohol and 32 parts of diethylene glycol was added to 30 parts of powdered gluten in a vessel. The mixture was heated to about 170° F. and held at about that temperature for about 1½ hours with stirring to extract the zein-containing proteins from the gluten. The mixture was then forced through a filter to separate the zein containing extract and the extract was then slowly heated to about 250° F. and held at about that temperature with stirring until the extract ceased visible boiling. The residue was a solution of zein-containing proteins principally in diethylene glycol.

*Example 2.*—A solvent mixture containing 72 parts of anhydrous isopropyl alcohol (99%), 40 parts of diethylene glycol and 8 parts of ethylene glycol was added to 30 parts of powdered gluten in a vessel. The mixture was heated to about 160° F. and held at about that temperature for about ½ hour with stirring to extract the zein-containing proteins from the gluten. The mixture was then forced through a filter to separate the zein-containing extract and the extract was then slowly heated to about 250° F. and held at about that temperature with stirring until cessation of visible boiling. The residue was a solution of zein-containing proteins principally in the mixture of glycols.

*Example 3.*—A solvent mixture containing 60 parts of a mixture consisting of 90% of denatured 95% alcohol (sold under the trade-mark "Paco") and 10% of water, and 40 parts of diacetone alcohol (acetone free) was added to 30 parts of powdered gluten in a vessel. The mixture was heated to about 140° F. and held at about that temperature for about ½ hour with stirring to extract the zein-containing proteins from the gluten. The mixture was then forced through a filter to separate the zein-containing extract and the extract was then slowly heated to about 220° F. and held at about that temperature until visible bubbling ceased. At the end point the residue separated out into a heavy paste and clear supernatent solvent. Upon the addition of about 1 part of water to the residue, the separated residue came together into solution formation. This solution was a solution of zein-containing proteins principally in the diacetone alcohol.

In an additional experiment with the same ingredients and with the same procedure as outlined in Example 3 except that heating of the extract was discontinued while the extract was still bubbling, a solution of the zein-containing proteins was obtained without the separation hereinabove pointed out.

In the following examples the manipulative procedures were the same as those set forth in Example 2, with the exceptions hereinafter noted, and in each instance the extracts were heated until cessation of visible boiling.

*Example 4.*—A solvent mixture of 72 parts of anhydrous synthetic methanol and 48 parts of diethylene glycol was added to 30 parts of powdered gluten. The procedure was as in Example 2 and the resulting residue was a solution of zein-containing proteins principally in diethylene glycol.

*Example 5.*—A solvent mixture containing 72 parts of anhydrous denatured alcohol ("Paco"), 40 parts of diethylene glycol and 8 parts of ethylene glycol was added to 30 parts of powdered gluten. The procedure was as in Example 2 and the resulting residue was a solution of zein-containing proteins principally in the mixture of glycols.

*Example 6.*—A solvent mixture containing 72 parts of a mixture consisting of 80% of dioxan and 20% of water, and 48 parts of diethylene glycol was added to 30 parts of powdered gluten. The procedure was as in Example 2 and the resulting residue was a solution of zein-containing proteins principally in diethylene glycol.

*Example 7.*—A solvent mixture containing 60 parts of a mixture consisting of 63% of n-butanol and 37% of water, and 40 parts of diethylene glycol was added to 30 parts of powdered gluten. The procedure was as in Example 2 except that the extraction temperature was 140° F. The resulting residue was a solution of zein-containing proteins principally in diethylene glycol.

*Example 8.*—A solvent mixture containing 60 parts of a mixture consisting of 88.4% of ethyl methyl ketone and 11.6% of water, and 40 parts of diethylene glycol was added to 30 parts of powdered gluten. The procedure was as in Example 2 except that the extraction temperature was 140° F. The resulting residue was a solution of zein-containing proteins principally in diethylene glycol.

*Example 9.*—A solvent mixture containing 72 parts of 91% isopropanol and 48 parts of propylene glycol was added to 30 parts of powdered gluten. The procedure was as in Example 2 except that the extraction temperature was 180° F. The resulting residue was a solution of zein-containing proteins principally in propylene glycol.

*Example 10.*—A solvent mixture containing 72 parts of 91% isopropanol and 48 parts of diethylene glycol monoethyl ether was added to 36 parts of powdered gluten. The procedure was as in Example 2 except that the extraction temperature was 180° F. The resulting residue was a solution of zein-containing proteins principally in diethylene glycol monoethyl ether.

*Example 11.*—A solvent mixture containing 72 parts of 91% isopropanol and 48 parts of a mixture consisting of 88.9% of propylene glycol and 11.1% of diethylene glycol monoethyl ether was added to 36 parts of powdered gluten. The procedure was as in Example 2 except that the extraction temperature was 180° F. The resulting residue was a solution of zein-containing proteins principally in the glycol and glycol ether mixture.

*Example 12.*—A solvent mixture containing 60 parts of denatured 95% alcohol ("Paco") and 40 parts of a mixture consisting of 75% of diethylene glycol and 25% benzyl alcohol was added to 30 parts of powdered gluten. The procedure was as in Example 2 except that the extraction temperature was 140° F. The resulting residue was a solution of zein-containing proteins principally in the diethylene glycol and benzyl alcohol mixture.

*Example 13.*—A solvent mixture containing 60 parts of anhydrous synthetic methanol and 40 parts of a solvent mixture consisting of 75% of diethylene glycol and 25% of ethylene glycol monoethyl ether was added to 30 parts of powdered gluten. The procedure was as in Example 2 except that the extraction temperature was 140° F. The resulting residue was a solution of the zein-containing proteins principally in the diethylene glycol and glycol ether mixture.

*Example 14.*—A solvent mixture containing 60 parts of a mixture consisting of 80% of denatured 95% ethyl alcohol ("Paco") and 20% of water, and 40 parts of a mixture consisting of 75% of diethylene glycol and 25% of ethylene glycol monoethyl ether was added to 30 parts of powdered gluten. The procedure was as in Example 2 except that the extraction temperature was 140° F. The resulting residue was a solution of zein-containing proteins principally in the glycol and glycol ether mixture.

*Example 15.*—A solvent mixture containing 60 parts of a mixture consisting of 90% of 91% isopropanol and 10% of water, and 40 parts of a mixture consisting of 75% of diethylene glycol and 25% of ethylene glycol monomethyl ether was added to 30 parts of powdered gluten. The procedure was as in Example 2 except that the extraction temperature was 140° F. The resulting residue was a solution of the zein-containing proteins principally in the diethylene glycol and glycol ether mixture.

*Example 16.*—A solvent mixture containing 60 parts of a mixture consisting of 80% of denatured 95% ethyl alcohol ("Paco") and 20% of water, and 40 parts of a mixture consisting of 75% of diethylene glycol and 25% of benzyl alcohol was added to 30 parts of powdered gluten. The procedure was as in Example 2 except that the extraction temperature was 140° F. The resulting residue was a solution of the zein-containing proteins principally in the diethylene glycol and benzyl alcohol mixture.

*Example 17.*—A solvent mixture containing 50 parts of a mixture consisting of 90% of 95% ethyl alcohol and 10% of water, and 35 parts of benzyl alcohol was added to 30 parts of powdered gluten. The procedure was as in Example 2 except that the extraction temperature was 140° F. The resulting residue was a solution of the zein-containing proteins principally in benzyl alcohol.

*Example 18.*—600 parts of 91% isopropyl alcohol were added to 165 parts of powdered gluten in a vessel. The mixture was heated to about 180° F. and held at about that temperature for about ½ hour with stirring to extract the zein-containing proteins from the gluten. The mixture was then forced through a filter to separate the zein-containing extract. To 100 parts of the extract 40 parts of propylene glycol were added and the mixture was slowly heated to about 250° F. and held at about that temperature with stirring until cessation of visible boiling. The residue was a solution of zein-containing proteins principally in propylene glycol.

In the following examples the manipulative procedures were the same as set forth in Example 18 except that the extractions were carried out at 140° F. and the proportions varied as hereinafter set forth. In each instance the mixture of extract and relatively high boiling point solvent was heated until cessation of visible boiling.

*Example 19.*—75 parts of powdered gluten were extracted with 125 parts of a solvent mixture consisting of 70% of denatured 95% ethyl alcohol (sold under the trade-mark "Synasol"), and 30% of water. 42½ parts of diethylene glycol were added to 100 parts of the extract. The procedure was as in Example 18 and the resulting solution was a solution of zein-containing proteins principally in diethylene glycol.

*Example 20.*—75 parts of powdered gluten were extracted with 187 parts of a solvent mixture consisting of 70% of denatured 95% ethyl alcohol ("Synasol"), and 30% of water. 29½ parts of diethylene glycol were added to 50 parts of the extract. The procedure was as in Example 18 and the resulting solution was a solution of zein-containing proteins principally in diethylene glycol.

*Example 21.*—29½ parts of propylene glycol were added to 50 parts of the extract of Example 20. The procedure was as in Example 18 and the resulting solution was a solution of zein-containing proteins in propylene glycol.

*Example 22.*—29½ parts of diethylene glycol monoethyl ether were added to 50 parts of the extract of Example 20. The procedure was as in Example 18 and the resulting solution was a solution of zein-containing proteins principally in diethylene glycol monethyl ether.

*Example 23.*—30 parts of powdered gluten were extracted with 75 parts of a solvent mixture consisting of 80% of dioxan and 20% of water. 30 parts of ethylene glycol monoethyl ether were added to 47 parts of the extract. The procedure was as in Example 18 and the resulting solution was a solution of zein-containing proteins principally in ethylene glycol monoethyl ether.

*Example 24.*—30 parts of powdered gluten were extracted with 75 parts of a solvent mixture consisting of 63% of n-butyl alcohol and 37% of water. 19.3 parts of benzyl alcohol were added to 44 parts of the extract. The procedure was as in Example 18 and the resulting solution was a solution of zein-containing proteins principally in benzyl alcohol.

*Example 25.*—20 parts of powdered gluten were extracted with 60 parts of denatured 95% ethyl alcohol ("Synasol"). 27 parts of cyclohexanol were added to 45 parts of the extract. The procedure was as in Example 18 except that 2% of water was added to the final solution. The resulting solution was a solution of zein-containing proteins principally in cyclohexanol.

*Example 26.*—20 parts of powdered gluten were extracted with 50 parts of a solvent mixture consisting of 60% of 91% isopropyl alcohol and 40% of water. 17½ parts of diethylene glycol were added to 35 parts of the extract. The procedure was as in Example 18 and the resulting solution was a solution of zein-containing proteins principally in diethylene glycol.

At the cessation of boiling as referred to in the examples some proportion of the lower boiling constituents of the diluent originally used remains in the final solution. The proportion thereof so remaining depends upon the final temperature and the boiling point curve of the mixture. Considerable proportions of the diluent or of its constituents, including water, may remain without causing gelling of the final solution in reasonable periods of time. This is particularly true where the glycols are used. In this respect the final solutions show differences from solutions of commercial zein containing large amounts of water as in the prior art, apparently by reason of some changes in the character or structure of the zein-containing proteins of the corn gluten taking place in the process of the present invention, the nature of which changes is not as yet understood.

In general and influenced by the type and amount of zein protein present, the solutions prepared as described above and the coating compositions prepared therefrom have the properties, particularly when heated, of being able to "give up" their solvent or solvents readily, and when applied to a surface they quickly and readily form tough, flexible, non-tacky, hard and generally transparent coatings even when retaining some solvent. The coatings formed by these zein-containing solutions and coating compositions are very strong and have adherent properties. In these solutions and coating compositions the film forming properties thereof can be built up to produce films of great toughness, flexibility, hardness and gloss. Under normal temperature conditions, many of the zein-containing solutions or coating compositions will produce non-blushing coatings on drying, without the aid of supplementary anti-blushing agents as in the prior art.

The coating compositions prepared from the above solutions may be used for coating, sizing, or impregnating any material, such as paper, textiles, wood, wood pulp and the like. When coated on paper, Cellophane, glass and the like, a film is formed which possesses the film characteristics set forth above. Since many of these coating compositions have decided adhesive properties, they may be used either per se or in combination with other materials for uniting or laminating paper, cloth, wood, glass, felt, Cellophane, metals and metal foils and the like.

The characteristics of the zein-containing coating compositions and hence of the ultimate films formed therefrom can be altered at will and as desired by the inclusion of modifiers, plasticizers, fillers and the like. Thus, the coating compositions may be modified by the inclusion therein of common lacquer solvents or lacquer plasticizers and the like such as, for example, dioxan; the ketones such as acetone, methyl ethyl ketone, diisobutyl ketone and the like; the esters such as methyl acetate, ethyl acetate, ethyl butyrate, butyl butyrate, glycol diacetate, the esters of the glycol ethers and the like; the alcohol ethers such as ethylene glycol monobutyl ether, diethylene glycol monobutyl ether and the like as well as glycerine derivatives; the alcohols such as ethanol, denatured alcohol, butanol, isobutanol, amyl alcohol, and higher alcohols such as octyl alcohol, cetyl alcohol, lauryl alcohol, myristyl alcohol and the like; the hydrocarbons such as benzene, toluene, xylene, cyclohexane and the like; chlorinated compounds such as ethylene dichloride, monochlorobenzene, orthodichlorobenzene, dischloroethyl ether and the like; furane derivatives such as furfuryl acetate, furfural and the like; and plasticizing esters such as dimethyl phthalate, dibutyl phthalate, diethyl phthalate, tricresyl, and triphenyl phosphates and the like. It is obvious from the foregoing that other well-known common lacquer solvents, lacquer plasticizers and the like may be used in lieu of those hereinabove set forth.

Where any of the foregoing are used as diluents or extenders in accordance with the present invention and it is desired that the final solutions be modified thereby, they may be incorporated into the final solutions to the desired extent merely by carrying out the step of removal of the extender from solutions of zein-containing proteins in a mixture of extender and relatively high boiling point solvent so as to leave in the final solution the desired amount of such extender.

The characteristics such as spread and flow of these coating compositions may also be modified by the addition of a fatty acid such as, for example, oleic, linseed, hemp seed, lauric and like fatty acids having 8 or more carbon atoms in the chain; by the inclusion of fatty acid glycerides, either raw or treated, such as raw or bodied linseed, China-wood oil or the like. If desired, compatible natural and synthetic resins such as, for example, rosin, sandarac, copal, phenol-aldehyde, urea-aldehyde, glycerin-phthalic anhydrid, vinyl and like resins, or compatible cellulose derivatives such as, for example, high and low viscosity nitro-cellulose, cellulose acetate, ethyl cellulose and like cellulose derivatives may be incorporated in the coating compositions in various proportions to meet any desired needs.

The choice and quantity of modifiers, plasticizers, and the like which may be used are, of course, influenced by the purpose intended, the compatibility of the materials in the solutions and coating compositions, the specific properties desired in the coating compositions and the films deposited therefrom as well as by the known characteristics of the modifiers, plasticizers and the like utilized.

The fillers which may be used are suitable inert, fibrous or powdered materials such as cork, mica, sawdust, chalk, magnesite, clay, bentonite or equivalent colloidal clays, charcoal dust, pigments and the like. Any suitable color as well as opacity, where desired, may be imparted to the coating compositions, as by a pigment or dye, and the amounts of such coloring agents utilized may be varied rather widely to meet any needs in paints, inks, ink bases and the like.

In the preparation of a printing ink or printing ink base, for example, a solution formed as above described is mixed directly with the desired pigments, including fillers and coloring agent or mixtures thereof by any of the known methods such as by grinding in a stone paint mill, roller mill, ball mill or the like. If desired the pigments may be dispersed in a suitable medium which is compatible with the zein vehicle, and the dispersed pigments may then be mixed with the zein vehicle added to form the ink or ink base or the pigments may be ground or dispersed in a mixed vehicle containing the zein solution with such other vehicles as may be desired. The dispersing medium or other vehicle may suitably be a fatty acid such as linseed fatty acid, soya bean fatty acids, oleic acid, pine fatty acids (tall-oil) and the like, or fatty acid glycerides, resin and oil and oil varnish compositions and the like which are compatible with the zein solution used. The proportions of pigments, coloring agent or agents to the vehicle may vary widely to produce inks of varying consistencies to meet any desired need. Thus, I have produced suitable inks or ink bases wherein the pigment content varies from about 2% to about 85% by weight and the vehicle from about 15% to about 98%. These inks may vary in consistency from a thick smooth paste to a thin, free flowing liquid.

The pigments and coloring agent or agents utilized in printing inks prepared from solutions in accordance with my invention may suitably be a black color such as, for example, carbon black, lamp black, animal or bone black and the like; a precipitated color such as for example, cadmium yellow, cadmium red, Prussian blue, ultramarine blue and the like; earth colors such as ochres, siennas, iron oxides and the like; white pigments such as white lead, zinc oxide, titanium oxide, lithopone and the like; organic colors such as naphthol yellow S, Persian orange, lithol red, eosine, rhodamine, quinoline yellow, indigo, methyl violet and the like; and combinations of these coloring agents with fillers such as blanc fixe, barytes, asbestine, calcium carbonate, china clay, satin white and white pigments such as titanium oxide, lithopone, zinc oxide, white lead and the like.

It is, of course, obvious that the choice of the particular solution or vehicle combination utilized in preparing a printing ink is influenced by the properties desired in the ink and by the compatibility of the ingredients constituting the vehicle with the pigments and coloring agent or agents. By a proper choice of the solvents and of suitable modifying agents, the inks produced may be controlled as to consistency, drying time, flow, penetration, gloss, tendency toward thickening and action on the printing presses and the like. The choice of pigments and coloring agent or agents employed is likewise influenced by the properties desired in the inks as well as by the character of the vehicle with which it is to be mixed and the compatibility of the pigments and coloring agents with the particular solution or vehicle used. The pigment and vehicle combinations should be of such character that undue thickening or livering does not take place.

What has been said hereinabove with specific reference to printing inks obviously applies, in general, to paints, sizes and like coatings.

The following is an example of a printing ink produced in accordance with my invention.

74 gms. of the final solution of Example 1 were mixed with 16 gms. of carbon black (Peerless black), 8 gms. of a plasticizer consisting of 2 gms. of degras and 6 gms. of diethylene glycol in uniform intermixture, and 2 gms. of toner (dry alkali blue). The mixture was ground to an ink in a roller mill.

The ink had good consistency and flow, good after-tack, worked easily on the press and dried rapidly.

While my invention has been described in connection with certain specific examples, it is, of course, obvious it is not to be construed as limited to these examples or to the details of the methods set forth therein, since obvious changes in materials, proportions and method details will be apparent from the foregoing.

In the claims, the expression "diluent" refers to any one of the diluents or extenders described herein or to mixtures thereof; the expression "zein-containing protein solvent" refers to any one of the relatively high boiling point solvents having the required polar to non-polar balance described above or to mixtures of these solvents.

In the claims, the expression "an elevated temperature in the order of about 120° F. to about 170° F." is not to be construed as a precise critical range, but, rather, as a range of temperatures indicative of the elevated temperature at which the extractions may be carried out. Temperatures below about 120° F. and temperatures above about 170° F. may, obviously, be used. Thus, for example, in the foregoing illustrative Examples 9, 10, 11 and 18, extraction temperatures in the order of about 180° F. are used.

I claim:

1. The method of preparing directly from gluten a solution of zein-containing proteins in a solvent or mixture of solvents comprising as an essential solvent constituent for the zein-containing proteins, a solvent having a boiling point above about 125° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 125° C. and a miscible diluent therefor having a boiling point below about 125° C., separating the extract from the residual gluten and removing at least part of the diluent from the extract to form the aforesaid solution.

2. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 150° C. and a miscible diluent therefor having a boiling point below about 100° C., separating the extract from the residual gluten and removing at least part of the diluent from the extract to form the aforesaid solution.

3. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 150° C. and a miscible diluent therefor having a boiling point below about 125° C., separating the extract from the residual gluten and removing substantially all of the diluent from the extract to form the aforesaid solution.

4. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 150° C. and a miscible diluent therefor having a boiling point below about 125° C., said diluent being a solvent for said zein-containing proteins, separating the extract from the residual gluten and removing at least part of the diluent from the extract to form the aforesaid solution.

5. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 150° C. and a miscible diluent therefor having a boiling point below about 100° C., said diluent being a substantially anhydrous solvent for said zein-containing proteins, separating the extract from the residual gluten and removing at least part of the diluent from the extract to form the aforesaid solution.

6. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 150° C. and a miscible diluent therefor having a boiling point below about 125° C., said diluent being an azeotropic mixture of an alcohol and water which is a solvent for said zein-containing proteins, separating the extract from the residual gluten and removing at least part of the diluent from the extract to form the aforesaid solution.

7. The method of preparing directly from gluten a solution of zein-containing proteins in a solvent or mixture of solvents comprising as an essential solvent constituent for the zein-containing proteins, a solvent having a boiling point above about 150° C. and having a proportion of polar to non-polar radicals which lies within a range extending between the limits of the proportion of polar to non-polar radicals of methanol and the proportion of polar to non-polar radicals of ethanol, which comprises contacting gluten with a solvent mixture at an elevated temperature in the order of about 120° F. to about 170° F. to extract zein-containing proteins from the gluten, said solvent mixture comprising the aforesaid zein-containing protein solvent having a boiling point above about 150° C. and a miscible diluent therefor having a boiling point below about 100° C., said diluent being an azeotropic mixture of an aliphatic alcohol having from two to four carbon atoms in the molecule and water which is a solvent for said zein-containing proteins, separating the extract from the residual gluten and removing at least part of the diluent from the extract to form the aforesaid solution.

8. The method of preparing directly from gluten a solution of zein-containing proteins in a solvent or mixture of solvents comprising a glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising a glycol and a miscible diluent therefor having a boiling point below about 125° C., separating the extract from the residual gluten and removing at least part of the diluent from the extract to form the aforesaid solution.

9. The method of preparing directly from gluten a solution of zein-containing proteins in a solvent or mixture of solvents comprising a glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising a glycol and a miscible diluent therefor having a boiling point below about 125° C., said diluent being a solvent for said zein-containing proteins, separating the extract from the residual gluten and removing at least part of the diluent from the extract to form the aforesaid solution.

10. The method of preparing directly from gluten a solution of zein-containing proteins in a solvent or mixture of solvents comprising a glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising a glycol and a miscible diluent therefor having a boiling point below about 125° C., said diluent being a substantially anhydrous solvent for said zein-containing proteins, separating the extract from the residual gluten and removing at least part of the diluent from the extract to form the aforesaid solution.

11. The method of preparing directly from gluten a solution of zein-containing proteins in a solvent or mixture of solvents comprising a glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising a glycol and a miscible diluent therefor having a boiling point below about 125° C., said diluent being an azeotropic mixture of an alcohol and water which is a solvent for said zein-containing proteins, separating the extract from the residual gluten and removing at least part of the diluent from the extract to form the aforesaid solution.

12. The method of preparing directly from gluten a solution of zein-containing proteins in a solvent or mixture of solvents comprising a glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising a glycol and a miscible diluent therefor having a boiling point below about 125° C., said diluent being an azeotropic mixture of an aliphatic alcohol having from two to four carbon atoms in the molecule and water which is a solvent for said zein-containing proteins, separating the extract from the residual gluten and removing at least part of the diluent from the extract to form the aforesaid solution.

13. The method of preparing directly from gluten a solution of zein-containing proteins in a solvent or mixture of solvents comprising diethylene glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising diethylene glycol and 91% isopropyl alcohol, separating the extract from the residual gluten and removing at least part of the 91% isopropyl alcohol from the extract to form the aforesaid solution.

14. The method of preparing directly from gluten a solution of zein-containing proteins in a solvent or mixture of solvents comprising diethylene glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising diethylene glycol and methanol, separating the extract from the residual gluten and removing at least part of the methanol from the extract to form the aforesaid solution.

15. The method of preparing directly from gluten a solution of zein-containing proteins in a solvent or mixture of solvents comprising diethylene glycol as an essential solvent constituent for the zein-containing proteins, which comprises contacting gluten with a solvent mixture at an elevated temperature in the order of about 120° F. to about 170° F. to extract zein-containing proteins from the gluten, said solvent mixture comprising diethylene glycol and 95% ethyl alcohol, separating the extract from the residual gluten and removing at least part of the 95% ethyl alcohol from the extract to form the aforesaid solution.

ROY E. COLEMAN.

CERTIFICATE OF CORRECTION.

Patent No. 2,352,604.

July 4, 1944.

ROY E. COLEMAN.

It is hereby certified that error appears in the printed specification of the above numbered patent requiring correction as follows: Page 2, first column, line 48, after "point" insert --and--; page 4, second column, line 69, for "supernatent" read --supernatant--; page 6, first column, line 29, after "proteins" insert --principally--; and that the said Letters Patent should be read with this correction therein that the same may conform to the record of the case in the Patent Office.

Signed and sealed this 29th day of August, A. D. 1944.

Leslie Frazer (Seal)

Acting Commissioner of Patents.